United States Patent
Chang

(12) United States Patent (Chang)
(10) Patent No.: US 7,817,360 B2
(45) Date of Patent: Oct. 19, 2010

(54) LENS MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 70 days.

(21) Appl. No.: 12/327,525

(22) Filed: Dec. 3, 2008

(65) Prior Publication Data
US 2009/0225453 A1    Sep. 10, 2009

(30) Foreign Application Priority Data
Mar. 5, 2008    (CN) .......................... 2008 1 0300477

(51) Int. Cl.
G02B 7/02    (2006.01)
G02B 15/14    (2006.01)

(52) U.S. Cl. ...................... 359/824; 359/694

(58) Field of Classification Search ......... 359/694–701, 359/819–824
See application file for complete search history.

(56) References Cited

U.S. PATENT DOCUMENTS 6,067,421 A * 5/2000 Kitazawa et al. ............ 396/133
6,091,552 A * 7/2000 Ueyama ....................... 359/694

* cited by examiner

Primary Examiner—Mohammed Hasan
(74) Attorney, Agent, or Firm—Clifford O. Chi

(57) ABSTRACT

A lens module includes a lens, a barrel, a holder and a driving mechanism. The barrel is configured for receiving the lens. The holder is configured for receiving the barrel therein. The driving mechanism includes a first lever and a first piezoelectric device. The first lever includes a fixed end and a moving end and a connecting portion interconnected between the fixed end and the moving end. The fixed end of the first lever is pivotedly mounted in the holder. The moving end of the first lever is configured for driving the barrel to move. The first piezoelectric device is arranged between the connecting portion and the holder. The first piezoelectric device is extendable and contractible along an optical axis of the lens so as to control movement of the barrel along the optical axis relative to the holder.

14 Claims, 8 Drawing Sheets

LENS MODULE

BACKGROUND

1. Technical Field

The present disclosure generally relates to lens modules, particularly, to a lens module having a piezoelectric driving mechanism.

2. Description of Related Art

With the ongoing development of microcircuitry and multimedia technology, cameras, including still cameras and digital cameras are now in widespread use combined with various electronic devices. These cameras often feature autofocus and zoom functions.

Lens modules are key camera components. Driving mechanisms, such as step motors, have recently been integrated into the lens modules for moving the lenses, to provide autofocus and zoom function. However, the step motor is generally relatively bulky and heavy when applied to a single lens, and, in addition, consumes a substantial amount of power, especially relative to the capabilities of a typical battery system of a camera or electronic device.

What is needed, therefore, is a lens module which has a simple and energy-efficient driving mechanism.

DETAILED DESCRIPTION OF THE DISCLOSURES

Figure 1:
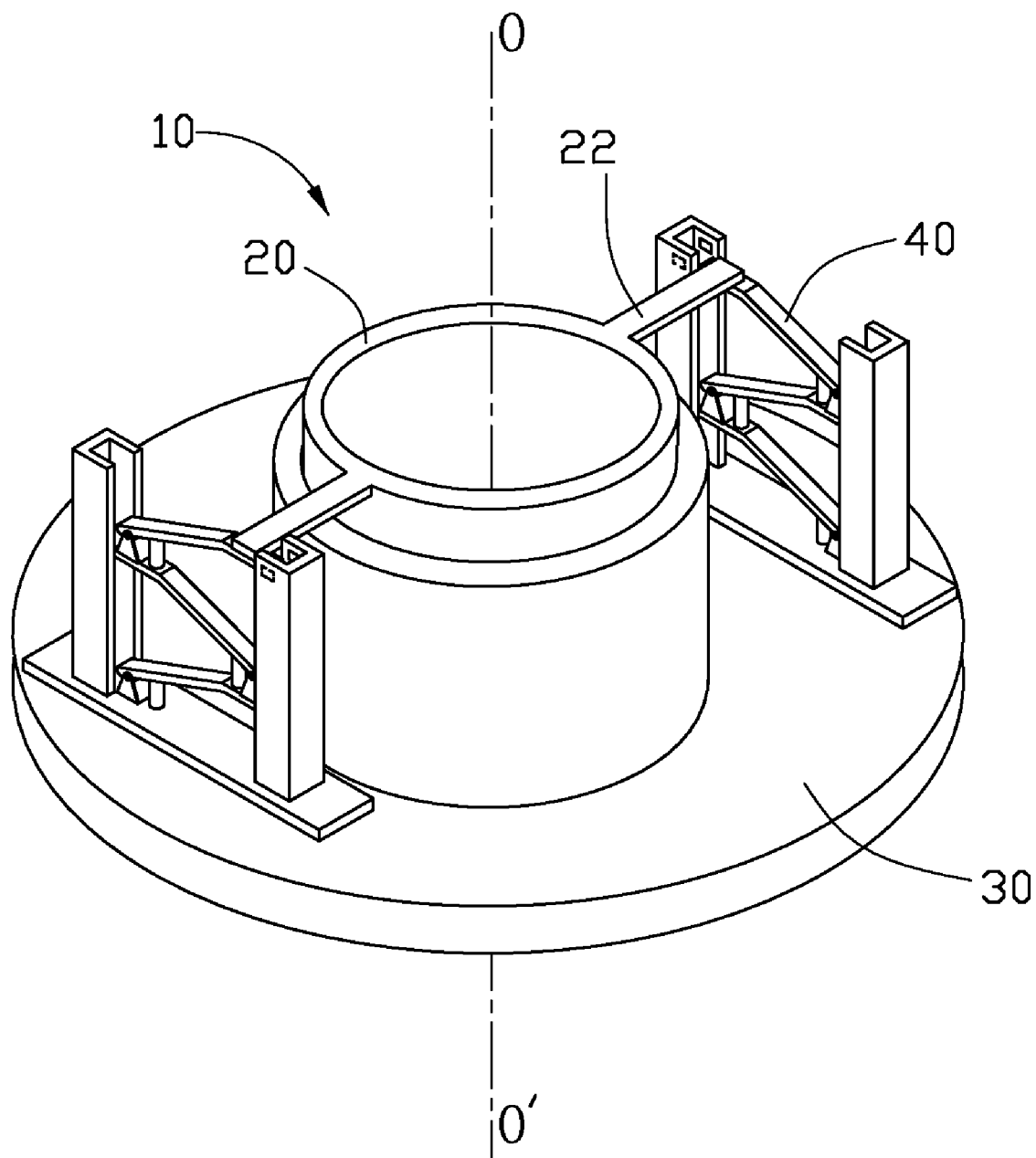
FIG. 1 is a perspective view of a lens module in accordance with a first embodiment.
Figure 2:
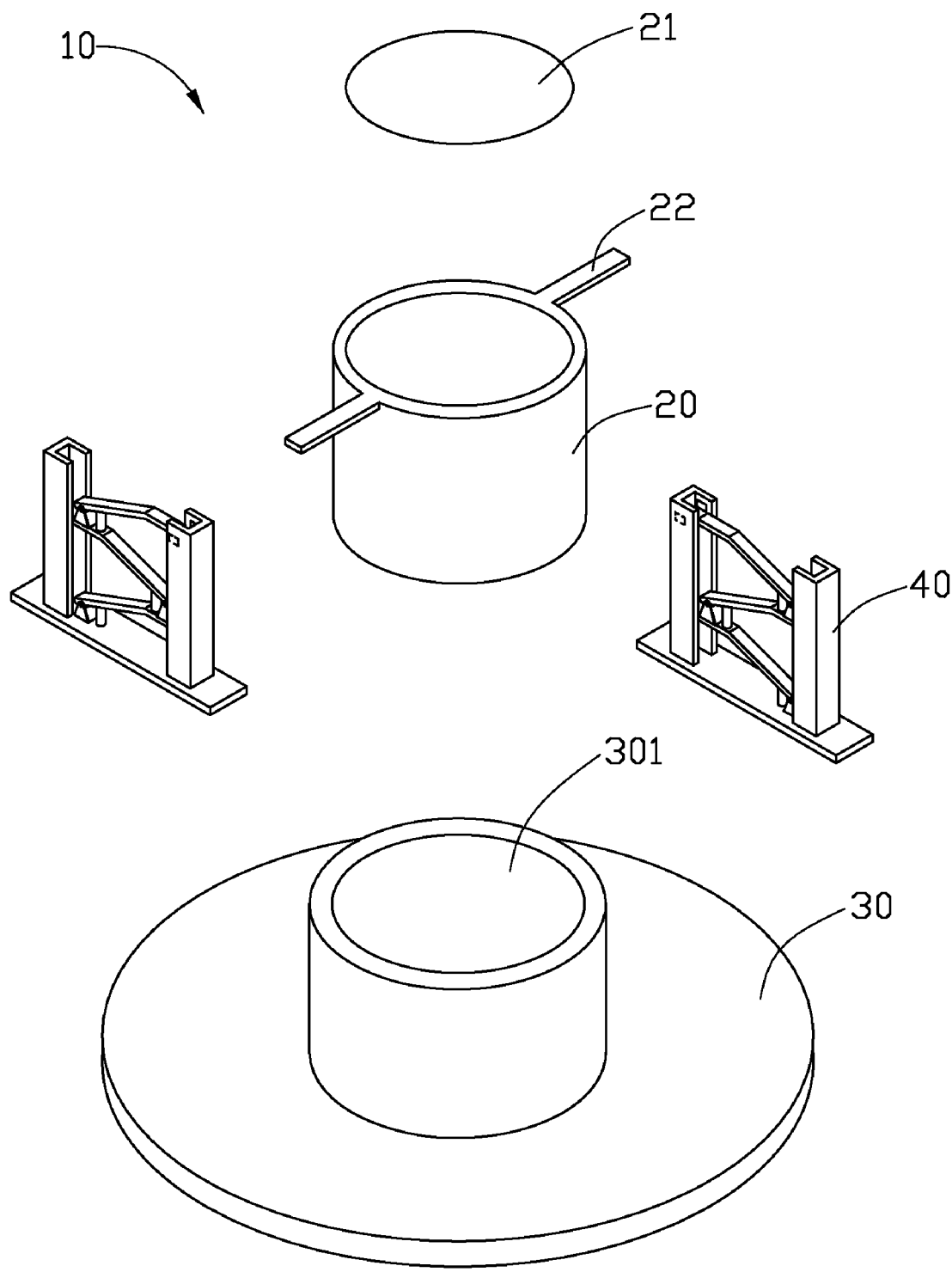
FIG. 2 is an exploded perspective view of a lens module in accordance with a first embodiment.

Referring to FIG. 1, a lens module 10 in accordance with a first embodiment of the present disclosure includes a barrel 20, a holder 30, and two driving mechanisms 40 for the barrel 20.

The barrel 20 receives at least one lens 21 fixed to the inner surface by adhesive. The lens 21 has an optical axis OO'. An outer surface of the barrel 20 is smooth. Two connecting arms 22 extend horizontally from a top end of the barrel 20.

The holder 30 includes a receiving chamber 301 receiving the barrel 20 therein. A surface of the receiving chamber 301 is smooth. The barrel 20 moves along the optical axis OO' of the lens 21 toward the holder 30.

Figure 3:
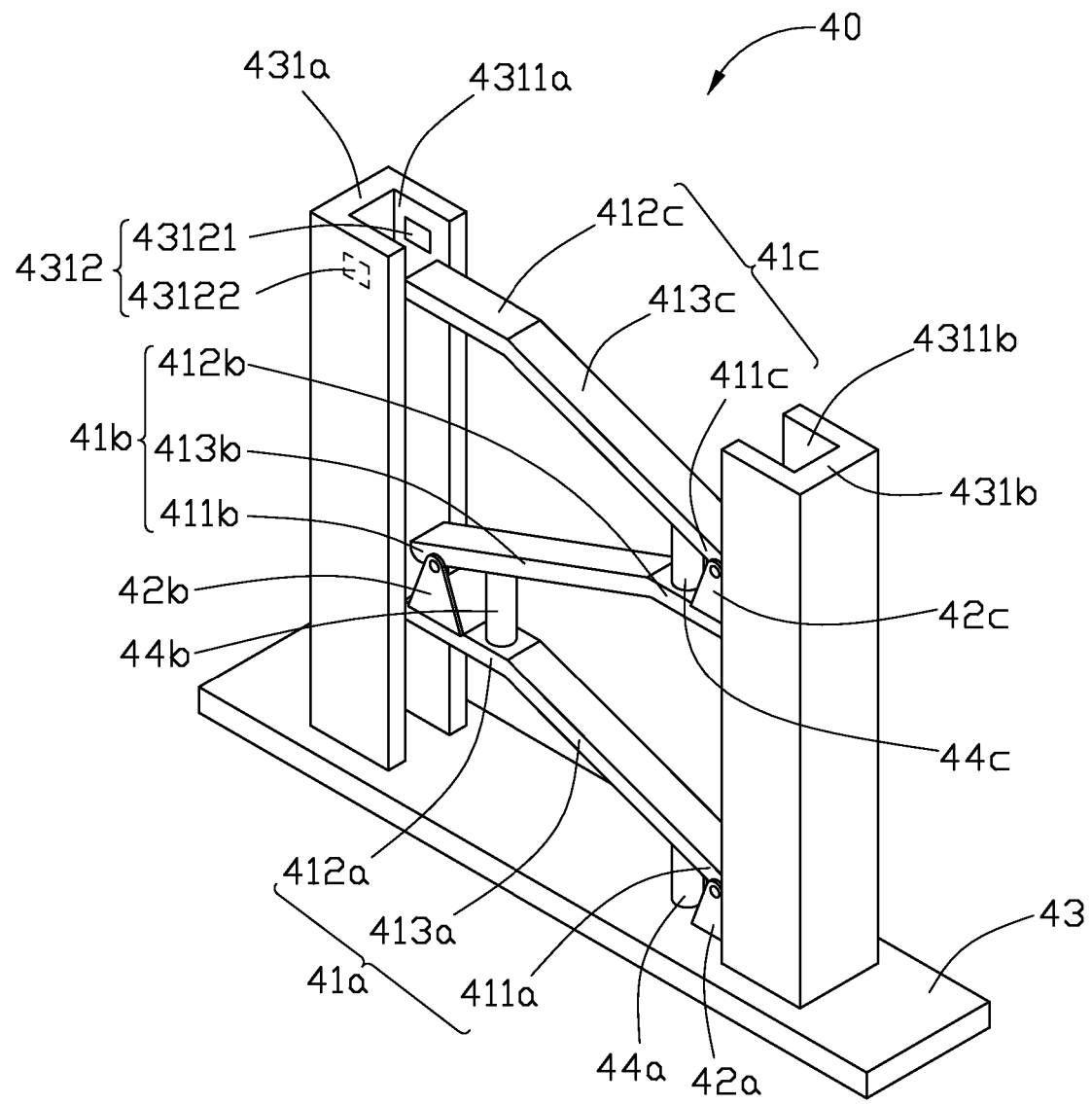
FIG. 3 is a perspective view of a driving mechanism of the lens module in accordance with a first embodiment.

Referring to FIG. 3, the driving mechanism 40 includes a first lever 41a, a second lever 41b, a third lever 41c, a first support 42a, a second support 42b, a third support 42c, a bottom plate 43, a first piezoelectric device 44a, a second piezoelectric device 44b, and a third piezoelectric device 44c.

Lever 41a includes a fixed end 411a, a moving end 412a, and a connecting portion 413a. The connecting portion 413a is interconnected between the fixed end 411a and the moving end 412a. The moving end 412a is higher than the fixed end 411a. Lever 41b includes a fixed end 411b, a moving end 412b, and a connecting portion 413b. The connecting portion 413b is interconnected between the fixed end 411b and the moving end 412b. The moving end 412b is higher than the fixed end 411b. Lever 41c includes a fixed end 411c, a moving end 412c, and a connecting portion 413c. The connecting portion 413c is interconnected between the fixed end 411c and the moving end 412c. The moving end 412c is higher than the fixed end 411c. Guide rails 431a and 431b are mounted on the bottom plate 43. A groove 4311a is defined on a side of arm 431a. A groove 4311b is defined on the opposite side of arm 431b. The grooves 4311a and 4311b receive the levers 41a, 41b, and 41c. The bottom plate 43 and guide rails 431a and 431b can be integrally formed.

The first support 42a is mounted on the bottom plate 43. The fixed end 411a of the first lever 41a is pivotedly mounted on the first support 42a. The second support 42b is mounted on the moving end 412a of the first lever 41a. The fixed end 411b of the second lever 41b is pivotedly mounted on the second support 42b. The third support 42c is mounted on the moving end 412b of the second lever 41b. The fixed end 411c of the third lever 41c is pivotedly mounted on the third support 42c. Thus, the moving end 412a, 412b or 412c of each lever 41a, 41b or 41c is rotated in the grooves 4311a, 4311b to move the barrel 20 along the optical axis OO' of the lens 21.

The first piezoelectric device 44a is arranged between the bottom plate 43 and the connecting portion 413a of the first lever 41a. The second piezoelectric device 44b is arranged between the fixed portion 412a of the first lever 41a and the connecting portion 413b of the second lever 41b. The third piezoelectric device 44c is arranged between the fixed portion 412b of the first lever 41b and the connecting portion 413c of the second lever 41c. The piezoelectric devices 44a, 44b, and 44c are electrostrictive material such as piezoelectric ceramic, and can be cylindrical.

In assembly, the two driving mechanisms 40 are fixed to the holder 30. The grooves 4311a, 4311b of the guide rails 431a, 431b are parallel with the optical axis OO' of the lens 21. The two connecting arms 22 of the barrel 20 are fixed to the two moving ends 412c of the two third levers 41c. The two driving mechanisms 40 move the barrel 20 along the optical axis OO' of the lens 21 in the holder 30. Each piezoelectric device 44a, 44b or 44c generates mechanical deformation when voltage is applied to each piezoelectric device 44a, 44b or 44c. Each piezoelectric device 44a, 44b or 44c rotates the moving end 412a, 412b or 412c to be extendable and contractible along the optical axis OO' of the lens 21 so as to control movement of the barrel 20 along the optical axis OO' relative to the holder 30. A position sensor 4312 is mounted in a top end of the groove 4311a to avoid overshoot of the moving end 412c of the third lever 41c. The position sensor 4312 includes an optical transmitter 43121 and an optical receiver 43122 receiving the light.

When voltage application ceases, the moving end 412c of the third lever 41c moves over position sensor 4312, which signals the driving mechanism 40 not to apply voltage. The length of each piezoelectric device 44a, 44b or 44c is restored, returning the moving end 412c of the third lever 41c to the original position. The driving mechanism 40 applies a lower voltage to each piezoelectric device 44a, 44b or 44c to avoid overshoot of the moving end 412c of the third lever 41c.

Figure 4:
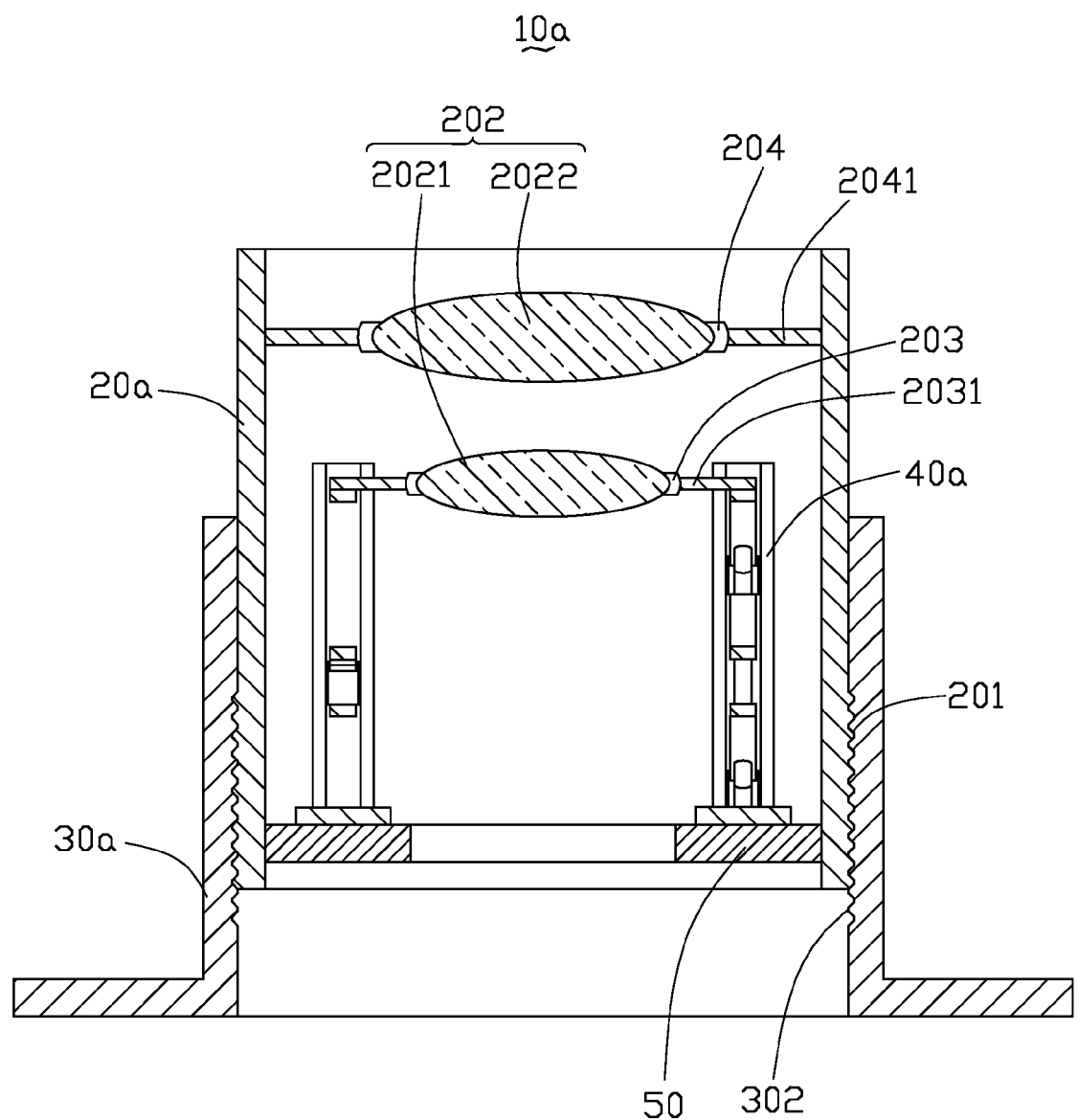
FIG. 4 is a sectional view of a lens module in accordance with a second embodiment.
Figure 5:
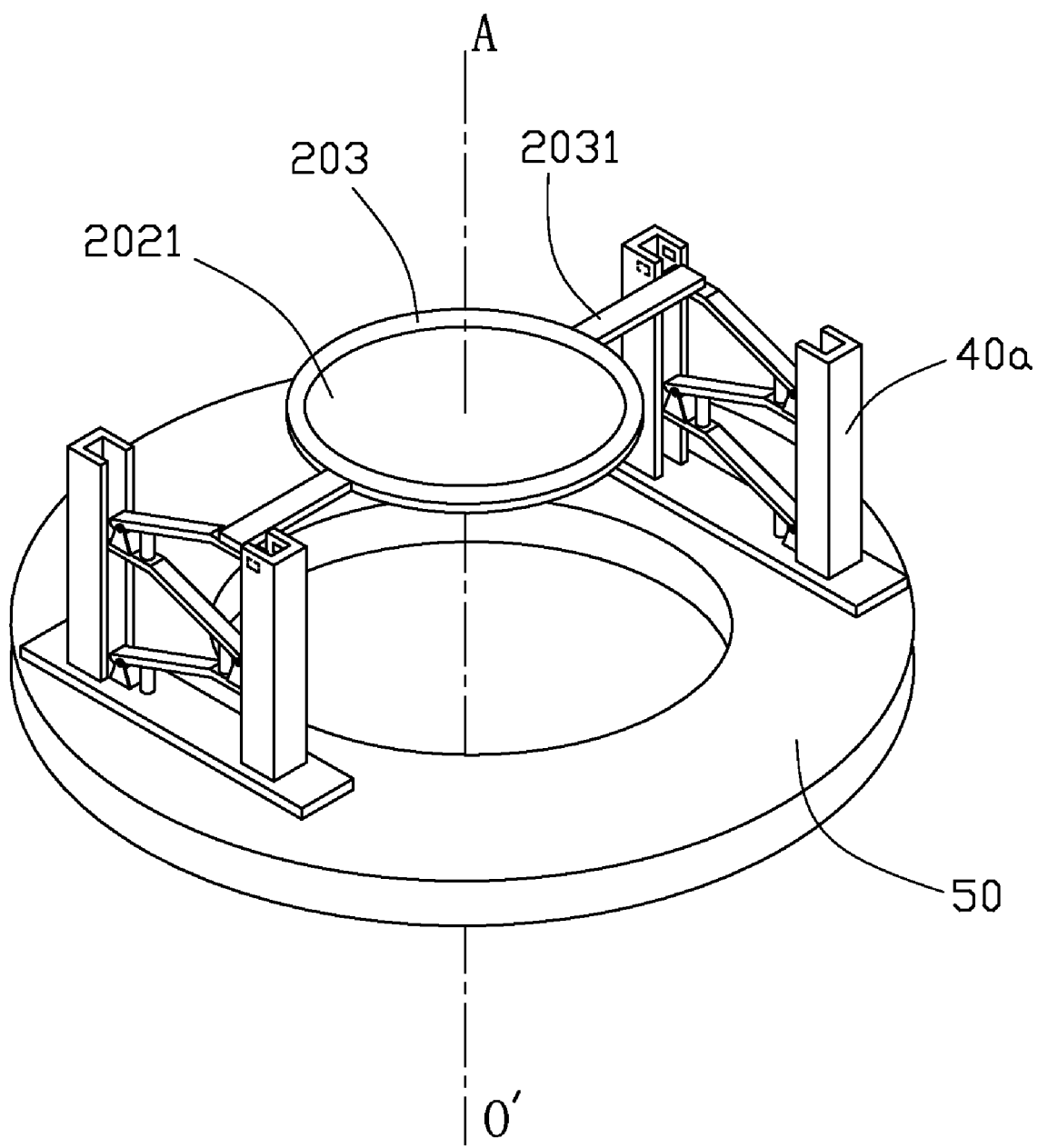
FIG. 5 is a perspective view of a lens module in accordance with a second embodiment.

Referring to FIGS. 4 and 5, an exemplary lens module 10a in accordance with a second embodiment of the disclosure includes a barrel 20a, a holder 30a, two driving mechanisms 40a and a supporting member 50 supporting the two driving mechanisms 40a.

The barrel 20a and the holder 30a are both cylindrical. The lens barrel 20a has an outer thread 201 formed thereon. The holder 30a has an inner thread 302 formed therein. The lens barrel 20a is threaded with the holder 30a. A lens assembly 202 is received in the barrel 20a. The lens assembly 202 has an optical axis AO'. The lens assembly 202 includes a first retaining ring 203 receiving a first lens 2021 and a second retaining ring 204 receiving a second lens 2022.

Two connecting arms 2031 horizontally extend from the first retaining ring 203 respectively. The two connecting arms 2031 are fixed to the two driving mechanisms 40a respectively. The two driving mechanisms 40a move the barrel 20a along the optical axis AO' in the holder 30a. Two connecting arms 2041 horizontally extend from the second retaining ring 204 respectively. The two connecting arms 2041 are fixed to the barrel 20a respectively.

The supporting member 50 is an annular plastic plate with a hole defined in the center thereof. The supporting member 50 is received in the barrel 20a and secured to the inner wall of the barrel 20a. The two driving mechanisms 40a are fixed to the supporting member 50. The two driving mechanisms 40a move the first lens 2021 along the optical axis AO' of the lens assembly 202 in the barrel 20a.

Figure 6:
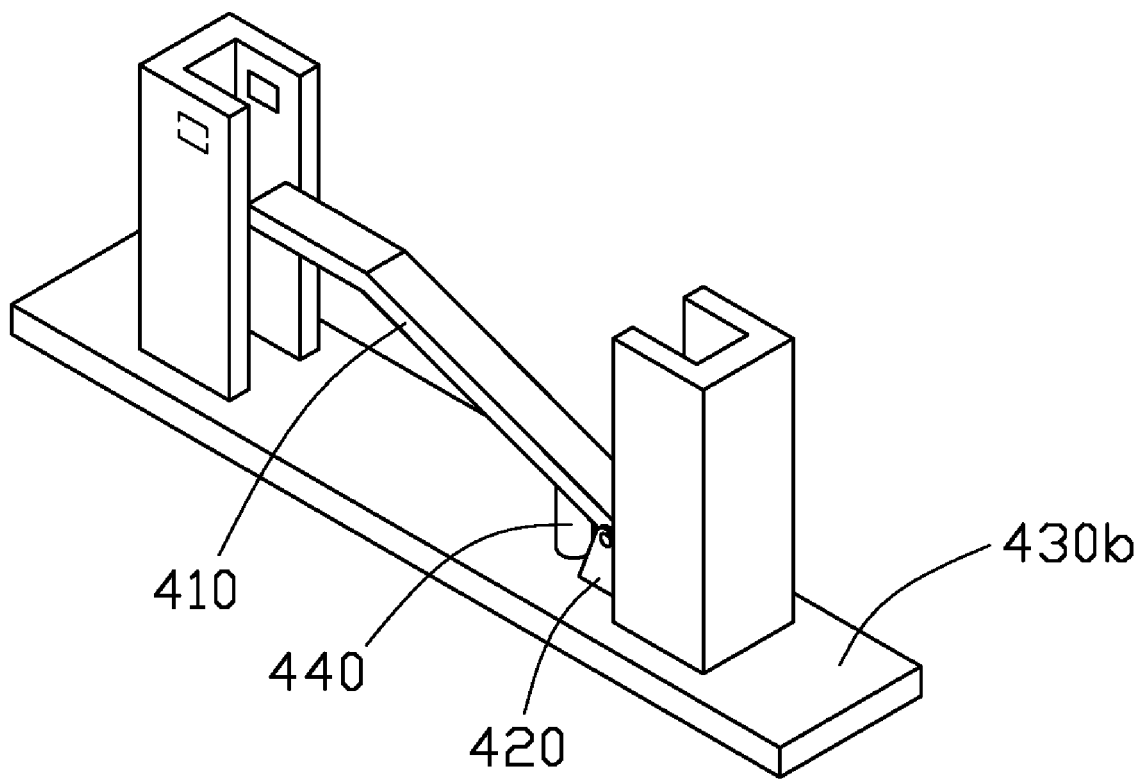
FIG. 6 is a perspective view of a driving mechanism of a lens module in accordance with a third embodiment.

Referring to FIG. 6, an exemplary driving mechanism 40b of the lens module (not shown) in accordance with a third embodiment is provided, differing from driving mechanism 40 only in that the driving mechanism 40b includes a first lever 410, a first support 420, a first piezoelectric device 440 and a bottom plate 430b. The first support 420 is mounted on the bottom plate 430b. The first lever 410 is pivotedly mounted on the first support 420. The first piezoelectric device 440 is arranged between the bottom plate 430b and the first lever 410.

Figure 7:
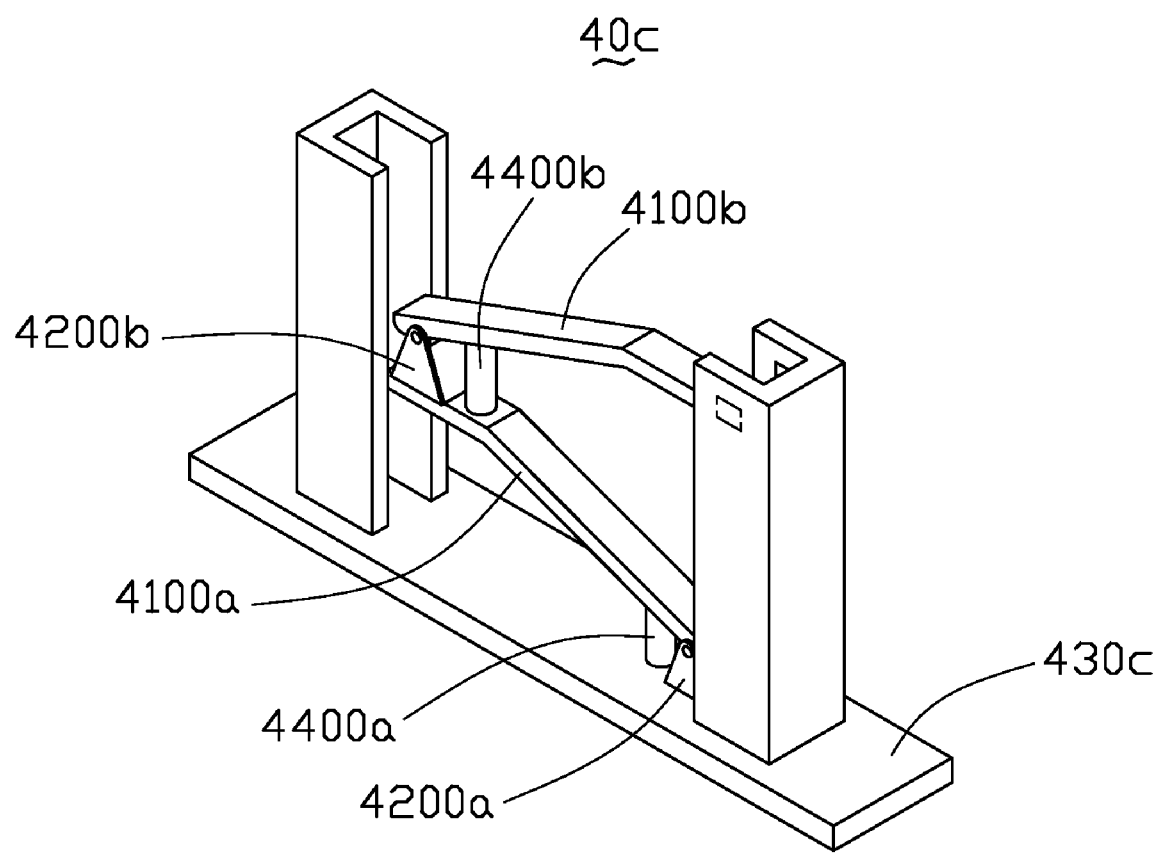
FIG. 7 is a perspective view of a driving mechanism of a lens module in accordance with a fourth embodiment.

Referring to FIG. 7, an exemplary driving mechanism 40c of the lens module (not shown) in accordance with a fourth embodiment, differing from the driving mechanism 40 only in that the driving mechanism 40b includes a first lever 4100a, a second lever 4100b, a first support 4200a, a second support 4200b, a first piezoelectric device 4400a, a second piezoelectric device 4400b and a bottom plate 430c. The first support 4200a is mounted on the bottom plate 430c. One end of the first lever 4100a is pivotedly mounted on the first support 4200a. The first piezoelectric device 4400a is arranged between the bottom plate 430c and the end of the first lever 4100a. The second support 4200b is mounted on the other end of first lever 4100a. The second lever 4100b is pivotedly mounted on the second support 4200b. The second piezoelectric device 4400b is arranged between the other end of the first lever 4100a and the second lever 4100b.

Figure 8:
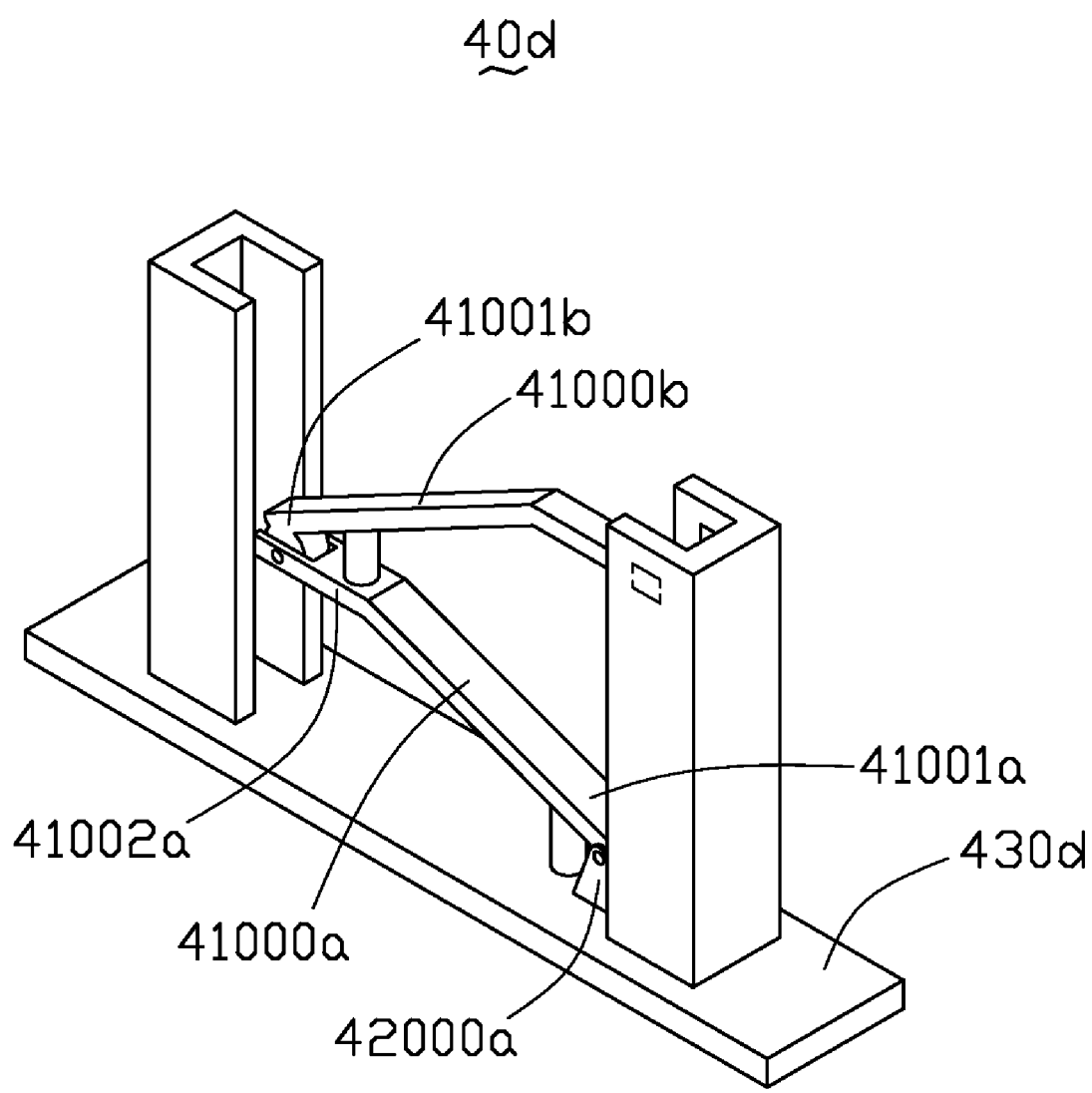
FIG. 8 is a perspective view of a driving mechanism of a lens module in accordance with a fifth embodiment.

Referring to FIG. 8, an exemplary driving mechanism 40d of the lens module (not shown) in accordance with a fifth embodiment is provided, differing from the driving mechanism 40c only in that a fixed end 41001b of a second lever 41000b is pivotedly mounted on the moving end 41002a of a first lever 41000a with no support.

It is to be understood that the described embodiments are intended to illustrate rather than limit the disclosure. Variations may be made without departing from the spirit of the disclosure as claimed. The above-described embodiment illustrates the scope of the disclosure but do not restrict the scope of the disclosure.

What is claimed is:

1. A lens module, comprising:
a lens;
a barrel receiving the lens;
a holder receiving the barrel therein; and
a driving mechanism comprising a first lever, a bottom plate, a first support and a first piezoelectric device, the first lever comprising a fixed end, a moving end and a connecting portion interconnected between the fixed end and the moving end, the bottom plate mounted on the holder, the first support mounted on the bottom plate, the fixed end of the first lever pivotedly mounted on the first support, the moving end configured for driving the barrel to move, the first piezoelectric device arranged between the connecting portion and the bottom plate, the first piezoelectric device being extendable and contractible along an optical axis of the lens so as to control movement of the barrel along the optical axis relative to the holder.

2. The lens module as claimed in claim 1, wherein the driving mechanism further includes a second support, a second lever, and a second piezoelectric device, the second support mounted on the moving end of the first lever, the second lever including a fixed end, a moving end and a connecting portion interconnected between the fixed end and the moving end, the fixed end of the second lever pivotedly mounted on the second support, the second piezoelectric device arranged between the moving end of the first lever and the connecting portion of the second lever, the second piezoelectric device being extendable and contractible along an optical axis of the lens.

3. The lens module as claimed in claim 2, wherein the driving mechanism further includes a third support, a third lever, and a third piezoelectric device, the third support mounted on the moving end of the second lever, the third lever including a fixed end, a moving end and a connecting portion interconnected between the fixed end and the moving end, the fixed end of the third lever pivotedly mounted on the third support, and the third piezoelectric device arranged between the moving end of the second lever and the connecting portion of the third lever, the third piezoelectric device being extendable and contractible along an optical axis of the lens.

4. The lens module as claimed in claim 3, wherein the barrel includes two connecting arms coupled to the driving mechanism.

5. The lens module as claimed in claim 3, wherein the driving mechanism includes two guide rails mounted on the bottom plate slidably engaged with the first, second and third levers.

6. The lens module as claimed in claim 1, wherein the driving mechanism further includes a second lever and a second piezoelectric device, the second lever including a fixed end, a moving end and a connecting portion interconnected between the fixed end and the moving end, the fixed end of the second lever pivotedly mounted on the moving end of the first lever, the piezoelectric device arranged between the moving end of the first lever and the connecting portion of the second lever.

7. A lens module, comprising:
a lens;
a barrel receiving the lens;
a supporting member;
a driving mechanism mounted on the supporting member and comprising a first lever, a bottom plate, a first support and a first piezoelectric device, the first lever comprising a fixed end, a moving end and a connecting portion interconnected between the fixed end and the moving end, the bottom plate mounted on the supporting member, the first support mounted on the bottom plate, wherein the fixed end of the first lever is pivotedly mounted on the first support, the first piezoelectric device is mounted between the connecting portion and the bottom plate, and the first piezoelectric device being extendable and contractible along an optical axis of the lens so as to control movement of the barrel along the optical axis relative to the supporting member.

8. The lens module as claimed in claim 7, wherein the driving mechanism further includes a second support, a second lever, and a second piezoelectric device, the second support mounted on the moving end of the first lever, the second lever including a fixed end, a moving end and a connecting portion interconnected between the fixed end and the moving end, the fixed end of the second lever pivotedly mounted on the second support, the second piezoelectric device arranged between the moving end of the first lever and the connecting portion of the second lever, the second piezoelectric device being extendable and contractible along an optical axis of the lens.

9. The lens module as claimed in claim 8, wherein the driving mechanism further includes a third support, a third lever, and a third piezoelectric device, the third support mounted on the moving end of the second lever, the third lever including a fixed end, a moving end and a connecting portion interconnected between the fixed end and the moving end, the fixed end of the third lever mounted in the third support, and the third piezoelectric device arranged between the moving end of the second lever and the connecting portion of the third lever, the third piezoelectric device being extendable and contractible along an optical axis of the lens.

10. The lens module as claimed in claim 9, wherein the barrel includes two connecting arms coupled to the driving mechanism.

11. The lens module as claimed in claim 9, wherein the driving mechanism includes two guide rails mounted on the bottom plate, slidably engaged with the first, second and third levers.

12. The lens module as claimed in claim 7, wherein the supporting member is an annular plate.

13. A lens module comprising:
a lens;
a housing; and
a driving mechanism comprising:
    a chain of articulated levers arranged in a zigzag fashion, the chain of the articulated levers having a fixed end fixed relative to the housing and a moving end coupled to the lens; and
    a plurality of piezoelectric devices, each of the piezoelectric devices being arranged between adjacent levers, and being extendable and contractible along an optical axis of the lens so as to control movement of the lens along the optical axis relative to the housing.

14. The lens module as claimed in claim 13, wherein the driving mechanism comprises two opposite guide rails slidably engaged with opposite lateral sides of the chain of the articulated levers.

* * * * *